United States Patent
Tang

(10) Patent No.: US 9,726,939 B2
(45) Date of Patent: Aug. 8, 2017

(54) TRANSFLECTIVE TYPE BLUE PHASE LIQUID CRYSTAL DISPLAY DEVICE AND LIQUID CRYSTAL DISPLAY MODULE OF THE SAME

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventor: Yuejun Tang, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 79 days.

(21) Appl. No.: 14/893,506

(22) PCT Filed: Oct. 21, 2015

(86) PCT No.: PCT/CN2015/092356
§ 371 (c)(1),
(2) Date: Nov. 23, 2015

(87) PCT Pub. No.: WO2017/049686
PCT Pub. Date: Mar. 30, 2017

(65) Prior Publication Data
US 2017/0082883 A1    Mar. 23, 2017

(30) Foreign Application Priority Data

Sep. 21, 2015   (CN) .......................... 2015 1 0605326

(51) Int. Cl.
*G02F 1/1335* (2006.01)
*G02F 1/1343* (2006.01)
(Continued)

(52) U.S. Cl.
CPC .......... *G02F 1/13394* (2013.01); *G02F 1/137* (2013.01); *G02F 1/133555* (2013.01);
(Continued)

(58) Field of Classification Search
CPC ..... G02F 2201/123; G02F 2001/13793; G02F 2001/13396; G02F 2001/13398;
(Continued)

(56) References Cited

U.S. PATENT DOCUMENTS

2010/0302492 A1* 12/2010 Kubota ............. G02F 1/134363
349/138

* cited by examiner

*Primary Examiner* — Charles Chang
(74) *Attorney, Agent, or Firm* — Andrew C. Cheng

(57) ABSTRACT

A transflective type blue phase liquid crystal display device and a liquid crystal display module of the same are disclosed. The transflective type blue phase liquid crystal display module includes an upper substrate, a lower substrate and blue phase liquid crystal molecules. Pixel electrodes and common electrodes are disposed alternately and disposed at intervals on an upper surface of each solid protrusion structure. Electric fields that are in parallel with a surface of each solid protrusion structure are generated in order to drive the blue phase liquid crystal molecules. Slope inclination angles provided at the upper portion and the lower portion of each solid protrusion structure are different such that optical delay properties at the transmissive region and the reflective region are identical.

18 Claims, 2 Drawing Sheets

(51) Int. Cl.
*G02F 1/1339* (2006.01)
*G02F 1/137* (2006.01)

(52) U.S. Cl.
CPC .................. *G02F 1/134363* (2013.01); *G02F 2001/13396* (2013.01); *G02F 2001/13398* (2013.01); *G02F 2001/13793* (2013.01); *G02F 2201/121* (2013.01); *G02F 2201/123* (2013.01)

(58) Field of Classification Search
CPC ........... G02F 1/13394; G02F 1/133555; G02F 1/137; G02F 1/134363; G02F 2201/121
USPC ................................. 349/114, 141
See application file for complete search history.

TRANSFLECTIVE TYPE BLUE PHASE LIQUID CRYSTAL DISPLAY DEVICE AND LIQUID CRYSTAL DISPLAY MODULE OF THE SAME

BACKGROUND OF THE INVENTION

1. Field of the Invention

The present invention relates to a liquid crystal display technology field, and more particularly to a transflective type blue phase liquid crystal display device and a liquid crystal display module of the same.

2. Description of Related Art

Comparing to the liquid crystal material used in the conventional liquid crystal display, the blue phase liquid crystal has four outstanding advantages: (1) a response time of the blue phase liquid crystal is within submillisecond, and no over-driving technology is required to achieve a high speed driving above 240 Hz so as to reduce a dynamic fuzzy of a moving image. When utilizing a RGB-LED as a backlight source, a color filter is not required, and using the blue phase liquid crystal can achieve a color timing display; (2) The blue phase liquid crystal does not require an alignment layer required by other types of display modes so as to simplify the manufacturing cost and reducing the cost; (3) Macroscopically, the blue phase liquid crystal is optically isotropic so that a blue phase liquid crystal display device has a wide viewing angle and good in a dark status; (4) When a thickness of a blue phase liquid crystal cell is greater than a penetration depth of an electric field, the influence transmittance by a change of the blue phase liquid crystal cell can be omitted. The above property is suitable for a large screen or a single panel liquid crystal display device.

However, in the conventional art, the blue phase liquid crystal faces a problem of too large driving voltage. Currently, an improved blue phase liquid crystal material is used or optimizing a structure of an electrode. However, the improved blue phase liquid crystal material is usually a blue phase liquid crystal material having a large Kerr constant. The above method relates to a complex process of synthesis of the blue phase liquid crystal material. For example, manufacturing a stable blue phase liquid crystal material requires considering a series of factors of monomer, photo initiator, and synthesis conditions. Accordingly, the development cost is very expensive. The method of optimizing a structure of an electrode utilizes an IPS (In-plane Switching) structure for driving, a penetration depth of a lateral electric field generated by parallel electrodes is limited, which requires a higher driving voltage. Therefore, the blue phase liquid crystal display technology using the IPS driving method still needs to be improved.

The reason that a display panel using the blue phase liquid crystal cannot adopt a vertical electric field is: when a voltage is applied on the display panel, under the function of a vertical electric field formed between a pixel electrode on an array substrate and a common electrode on a substrate oppositely to the array substrate, the blue phase liquid crystal is stretched in a vertical direction. When a polarized light passes through the blue phase liquid crystal stretched in the vertical direction, a phase of the polarized light does not change. A polarization state of the polarized light is the same as a voltage not applying on the blue phase liquid crystal. Besides, absorption axes of polarizing films of the liquid crystal display panel are perpendicular with each other. The light emitted from the backlight source cannot pass through the liquid crystal panel so that a bright status of the liquid crystal display panel cannot be obtained. Therefore, the above vertical electric field cannot be adopted to realize a display of grayscales of the blue phase liquid crystal display panel.

Because a liquid crystal display device is not an active light emitting device, and requires a backlight source to achieve a display effect so that a main display mode of the liquid crystal display device is a transmissive mode, which has a good readability indoors. However, under a strong sunlight or lighting, because of a reflective light of a surface of the liquid crystal display device, the readability in decreased. Generally, two methods are adopted to increase the readability outdoors: (1) increasing a brightness of the backlight source; (2) utilizing a reflective type liquid crystal display device. The first method obviously increases the power consumption. Therefore, the second method is usually adopted.

SUMMARY OF THE INVENTION

The embodiment of the present invention provides a transflective type blue phase liquid crystal display device and liquid crystal display module of the same in order to solve technology problems of too large driving voltage of the blue phase liquid crystal display device and poor optical consistency of a transmissive region and a reflective region.

In order to solve the above technology problem, an embodiment of the present invention provides a transflective type blue phase liquid crystal display module, comprising: an upper substrate; a lower substrate disposed oppositely to the upper substrate; blue phase liquid crystal molecules disposed between the upper substrate and the lower substrate; wherein, the lower substrate is provided with multiple solid protrusion structures, multiple pixel electrodes and multiple common electrodes are disposed alternately and disposed at intervals on an upper surface of each solid protrusion structure, each solid protrusion structure includes an upper portion and a lower portion, the upper portion of the solid protrusion structure is corresponding to a transmissive region, a location of the lower substrate corresponding to the lower portion which is not overlapped with the upper portion of the solid protrusion structure is provided with a reflective layer in order to form a reflective region; between the pixel electrodes and the common electrodes, electric fields that are in parallel with a surface of each solid protrusion structure are generated in order to drive the blue phase liquid crystal molecules, slope inclination angles of the upper portion and the lower portion of each solid protrusion structure are different such that optical delay properties at the transmissive region and the reflective region are identical.

Wherein, the slope inclination angle at the upper portion is smaller than the slope inclination angle at the lower portion.

Wherein, the slope inclination angle at the upper portion and the slope inclination angle at the lower portion are ranged from 25 degrees to 75 degrees.

Wherein, the slope inclination angle at the upper portion is smaller than 45 degrees, and the slope inclination angle at the lower portion is greater than 45 degrees.

Wherein, a phase delay of the transmissive region is two times of a phase delay of the reflective region.

Wherein, the transflective type blue phase liquid crystal display module further comprises an auxiliary spacer clamped between the upper substrate and the lower substrate, wherein a gap between the upper substrate and the pixel electrode or the common electrode which is located at a top portion of the solid protrusion structure is D1, a gap between the auxiliary spacer and the upper substrate or the lower substrate is D2, and D1 is greater than or equal to D2.

In order to solve the above technology problem, an embodiment of the present invention provides a transflective type blue phase liquid crystal display device including a transflective type blue phase liquid crystal display module, and the transflective type blue phase liquid crystal display module comprises: an upper substrate; a lower substrate disposed oppositely to the upper substrate; blue phase liquid crystal molecules disposed between the upper substrate and the lower substrate; wherein, the lower substrate is provided with multiple solid protrusion structures, pixel electrodes and common electrodes are disposed alternately and disposed at intervals on an upper surface of each solid protrusion structure, each solid protrusion structure includes an upper portion and a lower portion, the upper portion of the solid protrusion structure is corresponding to a transmissive region, a location of the lower substrate corresponding to the lower portion which is not overlapped with the upper portion of the solid protrusion structure is provided with a reflective layer in order to form a reflective region; between the pixel electrodes and the common electrodes, electric fields that are in parallel with a surface of each solid protrusion structure are generated in order to drive the blue phase liquid crystal molecules, slope inclination angles of the upper portion and the lower portion of each solid protrusion structure are different such that optical delay properties at the transmissive region and the reflective region are identical.

Wherein, the slope inclination angle at the upper portion is smaller than the slope inclination angle at the lower portion, and wherein, the slope inclination angle at the upper portion and the slope inclination angle at the lower portion are ranged from 25 degrees to 75 degrees.

Wherein, the slope inclination angle at the upper portion is smaller than 45 degrees, the slope inclination angle at the lower portion is greater than 45 degrees, and a phase delay of the transmissive region is two times of a phase delay of the reflective region.

Wherein, the transflective type blue phase liquid crystal display module further comprises an auxiliary spacer clamped between the upper substrate and the lower substrate, wherein a gap between the upper substrate and the pixel electrode or the common electrode which is located at a top portion of the solid protrusion structure is D1, a gap between the auxiliary spacer and the upper substrate or the lower substrate is D2, and D1 is greater than or equal to D2.

Comparing with the conventional art, the transflective type blue phase liquid crystal display device and liquid crystal display module of the same provided by the present invention, through disposing solid protrusion structures on the lower substrate, pixel electrodes and common electrodes are disposed alternately and disposed at intervals on an upper surface of each solid protrusion structure, each solid protrusion structure includes an upper portion and a lower portion, a slope inclination angle of the upper portion is smaller than a slope inclination angle of the lower portion, the upper portion of the solid protrusion structure is corresponding to a transmissive region, a location of the lower substrate corresponding to the lower portion which is not overlapped with the upper portion of the solid protrusion structure is provided with a reflective layer in order to form a reflective region, and between the pixel electrodes and the common electrodes, electric fields that are in parallel with a surface of each solid protrusion structure are generated in order to drive the blue phase liquid crystal molecules such that optical delay properties at the transmissive region and the reflective region are identical.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

Figure 1:
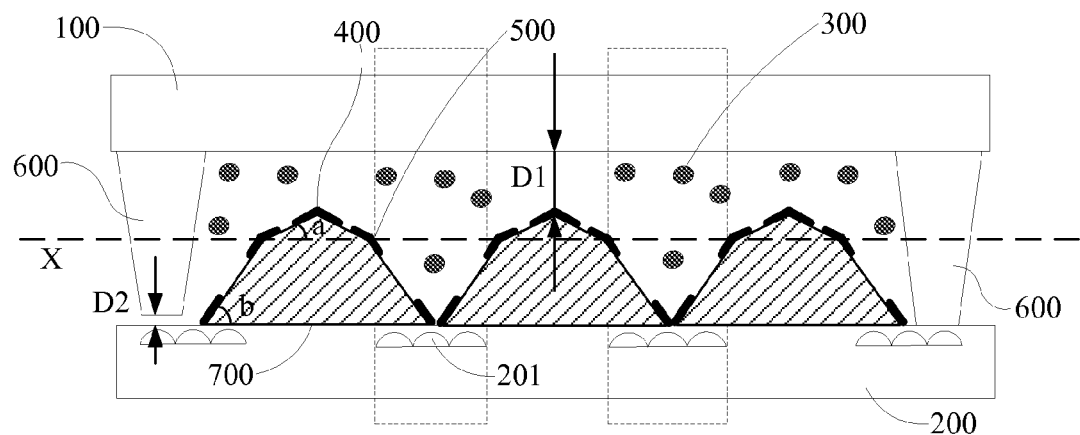
FIG. 1 is a cross-sectional view of a transflective type blue phase liquid crystal display module according to an embodiment of the present invention.

With reference to FIG. 1, FIG. 1 is a cross-sectional view of a transflective type blue phase liquid crystal display module according to an embodiment of the present invention. The transflective type blue phase liquid crystal display module includes but not limited to following elements: an upper substrate 100, a lower substrate 200, blue phase liquid crystal molecules 300, multiple common electrodes 400, multiple pixel electrodes 500 and an auxiliary spacer 600.

Specifically, the lower substrate 200 and the upper substrate 100 are disposed oppositely. The lower substrate 200 is provided with multiple stripe-shaped solid protrusion structures 700. A cross section of the multiple stripe-shaped solid protrusion structures 700 has projections and recesses undulated alternately with respect to the upper substrate 100 and the lower substrate 200. The blue phase liquid crystal molecules 300 are filled in a space formed by the multiple solid protrusion structures 700 and the upper substrate 100. Wherein, the solid protrusion structure 700 can be formed by a transparent photoresist layer.

The pixel electrodes 500 and the common electrodes 400 are disposed alternately and disposed at intervals on an upper surface of each solid protrusion structure 700. The upper surface of each solid protrusion structure 700 is provided with multiple stripe-shaped pixel electrodes 500 and multiple stripe-shaped common electrodes 400. Of course, the number of the multiple pixel electrodes 500 and the multiple common electrodes 400 are not limited as shown in the figure.

Each solid protrusion structure 700 includes an upper portion and a lower portion. A portion of each protrusion structure 700 above a dashed line X as shown in FIG. 1 is defined as the upper portion of the protrusion structure 700. A portion of each protrusion structure 700 below the dashed line X is defined as the lower portion of the protrusion structure 700. In the present embodiment, the upper portion is a triangular structure, and the lower portion is a trapezoidal structure. Of course, in another embodiment, the present invention is not limited. A slope inclination angle a of the upper portion is less than a slope inclination angle b of the lower portion. The slope inclination angle a of the upper portion and the slope inclination angle b of the lower portion are ranged from 25 degrees to 75 degrees. Preferably, the slope inclination angle a of the upper portion is less than 45 degrees, and the slope inclination angle b of the lower portion is greater than 45 degrees.

A portion of the lower substrate 200 is provided with a reflective layer 201 such that the lower substrate 200 is divided into a transmissive region and a reflective region. Preferably, the reflective layer 201 is disposed at a location of the lower substrate corresponding to the lower portions which are not overlapped with the upper portions of the solid protrusion structures 700 in order to form the reflective region. A dashed box shown in the figure is the reflective region, and the upper portion of the solid protrusion structure 700 correspondingly forms the transmissive region.

Although in the present embodiment, the protrusion structure utilizes a (In-Plane Switching) IPS electrode. However, the purpose of the IPS electrode structure is used to make the blue phase liquid crystal molecules to form oblique optical anisotropy under the electric field for the blue phase liquid crystal molecules which are isotropic. The operation principles of an IPS mode and a VA (vertical alignment) mode are utilized at the same time in the present invention in order to control a bright status and a dark status of the blue phase liquid crystal display device. The oblique IPS electrode on the protrusion structure can increase the density and the number of the IPS electrodes in a same horizontal width comparing with respect to the IPS electrodes on a horizontal plane so as to increase the electric field density. Utilizing the IPS and the VA mode simultaneously can decrease the driving voltage of the blue phase liquid crystal molecules.

Figure 2:
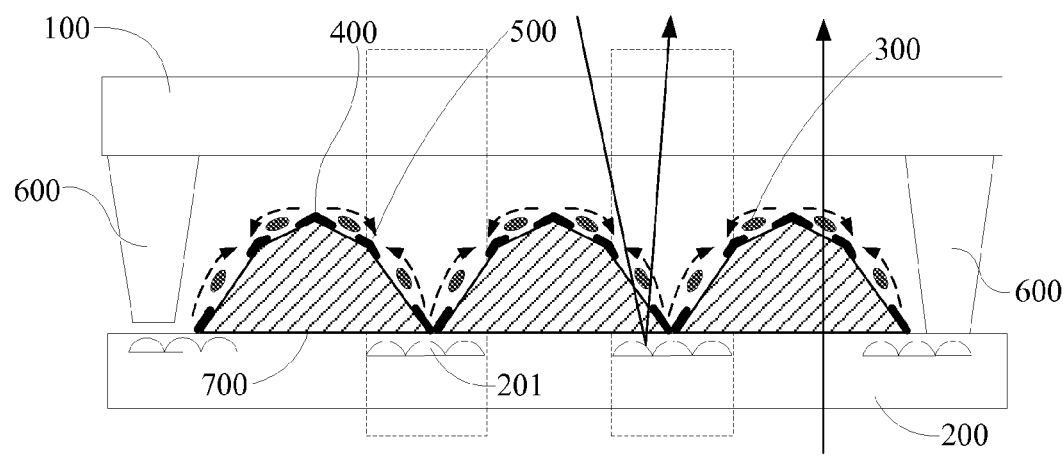
FIG. 2 is a cross-sectional view of a transflective type blue phase liquid crystal display when a power is applied according to an embodiment shown in FIG. 1.

FIG. 2 is a cross-sectional view of a transflective type blue phase liquid crystal display module when a power is applied according to an embodiment shown in FIG. 1. Between the pixel electrodes 500 and the common electrodes 400, electric fields that are in parallel with a surface of the solid protrusion structure 700 are generated in order to drive the blue phase liquid crystal molecules 300. Small dashed arrows in FIG. 2 show a distribution situation of the electric fields. When a voltage is applied on the pixel electrodes 500 and the common electrodes 400, the blue phase liquid crystal molecules 300 between the pixel electrodes 500 and the common electrodes 400 form the distribution situation as shown in FIG. 2. The oblique electric fields drive the blue phase liquid crystal molecules 300.

In order to balance a phase delay between the transmissive region and the reflective region, to realize a matching of electro-optical characteristic curves of the transmissive region and the reflective region of the transflective type blue phase liquid crystal display device. The transmissive region and the reflective region both utilize a liquid crystal layer having a same thickness. However, a tilting angle of the electric field between the electrodes in the transmissive region and a tilting angle of the electric field between the electrodes in the reflective region are different. The solid line arrows in FIG. 2 represent propagation paths of lights. A distance that a light passing through the transmissive region is equal to one half of a distance that a light enters the reflective region and be reflected out from the reflective region.

Through disposing the slope inclination angles (a and b) at the upper portion and the lower portion of the solid protrusion structure 700 to be different, the reflective region generates a smaller horizontal component of the electric field than the transmissive region. That is, the horizontal component of optical anisotropy formed by the blue phase liquid crystal molecules is greater at the transmissive region than at the reflective region. By adjusting an angle relationship between a and b such that a phase delay of an ambient light passing through the liquid crystal layer twice and a phase delay of an ambient light passing through the liquid crystal layer once are identical. That is, a phase delay in the transmissive region is two times of a phase delay in the reflective region such that the transmissive region and the reflective region have the same electro-optical characteristic.

Specifically, when a light passes through the transmissive region, a path of the light is a thickness of the display module. When a light passes through the reflective region, one reflection is required so that a path of the light is two thicknesses of the display module. A distance that a light passing through the transmissive region is equal to one half of a distance that a light enters the reflective region and be reflected out from the reflective region.

In order to make electro-optical characteristics of the transmissive region and the reflective region to be more consistent. Multiple testing panels having different slope inclination angles (a and b) can be provided. For example, an angle a of the upper portion of the solid protrusion structure 700 is 30 degrees, and an angle b of the lower portion of the solid protrusion structure 700 is 50 degrees. Through adjusting the inclination angles of the upper portion and the lower portion of the solid protrusion structure 700 to make a phase delay of an ambient light passing through the liquid crystal layer twice and a phase delay of an ambient light passing through the liquid crystal layer once to be identical. That is, a phase delay in the transmissive region is two times of a phase delay in the reflective region (because as describe above: a distance that a light passing through the transmissive region is equal to one half of a distance that a light enters the reflective region and be reflected out from the reflective region). Of course, the present embodiment only provides an example for an angle relationship. According to the teaching of the present invention, person skilled in the art can adjust the angles of the upper portion and the lower portion of the solid protrusion structure 700 by himself in order to satisfy a requirement of the phase delay.

Besides, same blue phase liquid crystal molecules are filled in the testing panels. Drawing voltage-transmittance (V-T) curves at the transmissive regions and the reflective regions of multiple testing panels. The specifically testing method is: obtaining V-T curves of the transmissive region under a condition of providing light by a backlight source and no ambient light; turning off the backlight source and providing a strong ambient light in order to obtain V-T curves of the reflective region; if the curves of the transmissive region and the reflective region are identical within an error range, a phase delay of a light passing through the transmissive region is approximately two times of a phase delay of a light passing through the reflective region. Accordingly, a ratio relationship of the testing panel can be a reference value in an actual production so as to ensure an identical optical delay of the transmissive region and the reflective region.

With reference to FIG. 1 again, the auxiliary spacer 600 is clamped between the upper substrate and the lower substrate. A gap between the upper substrate 100 and the pixel electrode 500 or the common electrode 400 which is located at a top portion of the solid protrusion structure 700 is D1. A gap between the lower substrate 200 and the auxiliary spacer 600 (sub PS) is D2, wherein D1 is greater than or equal to D2. By this way, because the auxiliary spacer 600 can abut against the upper substrate 100 in order to protect the pixel electrode 500 and the common electrode 400 from being destroyed. Besides, the gap D2 can be a gap between an auxiliary spacer 600 and an upper substrate 100. Similarly, a condition that D1 is greater than or equal to D2 should be satisfied.

The transflective type blue phase liquid crystal display module of the present embodiment, through disposing solid protrusion structures on the lower substrate, pixel electrodes and common electrodes are disposed alternately and disposed at intervals on an upper surface of each solid protrusion structure, each solid protrusion structure includes an upper portion and a lower portion, a slope inclination angle of the upper portion is smaller than a slope inclination angle of the lower portion, the upper portion of the solid protrusion structure is corresponding to a transmissive region, a location of the lower substrate corresponding to the lower portion which is not overlapped with the upper portion of the solid protrusion structure is provided with a reflective layer in order to form a reflective region, and between the pixel electrodes and the common electrodes, electric fields that are in parallel with a surface of each solid protrusion structure are generated in order to drive the blue phase liquid crystal molecules such that optical delay properties at the transmissive region and the reflective region are identical.

Figure 3:
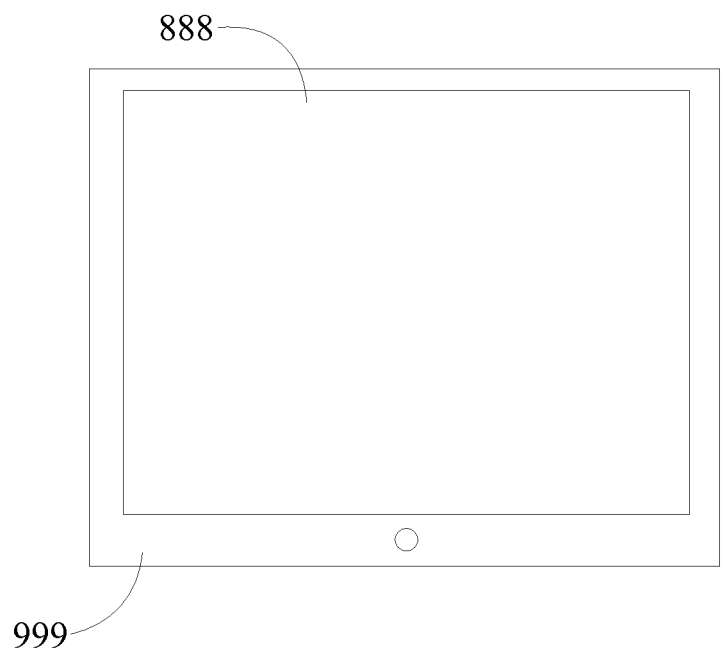
FIG. 3 is a schematic structure diagram of a transflective type blue phase liquid crystal display device according to an embodiment of the present invention.

Besides, the embodiment of the present invention also provides a transflective type blue phase liquid crystal display device. With reference to FIG. 3, FIG. 3 is a schematic structure diagram of a transflective type blue phase liquid crystal display device according to an embodiment of the present invention. The transflective type blue phase liquid crystal display device includes: a case 999 and a transflective type blue phase liquid crystal display module 888 disposed inside the case 999.

The transflective type blue phase liquid crystal display module 888 are as shown in FIG. 1 and FIG. 2, and the technology features are the same as the above embodiments, no more repeating here. Technology features of other structures of the transflective type blue phase liquid crystal display device can be understood by person skilled in the art, no more repeating.

The transflective type blue phase liquid crystal display device of the present embodiment, through disposing solid protrusion structures on the lower substrate, pixel electrodes and common electrodes are disposed alternately and disposed at intervals on an upper surface of each solid protrusion structure, each solid protrusion structure includes an upper portion and a lower portion, a slope inclination angle of the upper portion is smaller than a slope inclination angle of the lower portion, the upper portion of the solid protrusion structure is corresponding to a transmissive region, a location of the lower substrate corresponding to the lower portion which is not overlapped with the upper portion of the solid protrusion structure is provided with a reflective layer in order to form a reflective region, and between the pixel electrodes and the common electrodes, electric fields that are in parallel with a surface of each solid protrusion structure are generated in order to drive the blue phase liquid crystal molecules such that optical delay properties at the transmissive region and the reflective region are identical.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A transflective type blue phase liquid crystal display module, comprising:
an upper substrate;
a lower substrate disposed oppositely to the upper substrate; and
blue phase liquid crystal molecules disposed between the upper substrate and the lower substrate;
wherein, the lower substrate is provided with multiple solid protrusion structures, multiple pixel electrodes and multiple common electrodes are disposed alternately and disposed at intervals on an upper surface of each solid protrusion structure, each solid protrusion structure includes an upper portion and a lower portion, the upper portion of the solid protrusion structure is corresponding to a transmissive region, a location of the lower substrate corresponding to the lower portion which is not overlapped with the upper portion of the solid protrusion structure is provided with a reflective layer in order to form a reflective region; and
between the pixel electrodes and the common electrodes, electric fields that are in parallel with a surface of each solid protrusion structure are generated in order to drive the blue phase liquid crystal molecules, slope inclination angles of the upper portion and the lower portion of each solid protrusion structure are different such that optical delay properties at the transmissive region and the reflective region are identical.

2. The transflective type blue phase liquid crystal display module according to claim 1, wherein, the slope inclination angle at the upper portion is smaller than the slope inclination angle at the lower portion.

3. The transflective type blue phase liquid crystal display module according to claim 2, wherein, the slope inclination angle at the upper portion and the slope inclination angle at the lower portion are ranged from 25 degrees to 75 degrees.

4. The transflective type blue phase liquid crystal display module according to claim 3, wherein, the slope inclination angle at the upper portion is smaller than 45 degrees.

5. The transflective type blue phase liquid crystal display module according to claim 4, wherein, the slope inclination angle at the lower portion is greater than 45 degrees.

6. The transflective type blue phase liquid crystal display module according to claim 1, wherein, a phase delay of the transmissive region is two times of a phase delay of the reflective region.

7. The transflective type blue phase liquid crystal display module according to claim 1, wherein, the transflective type blue phase liquid crystal display module further comprises an auxiliary spacer clamped between the upper substrate and the lower substrate, wherein a gap between the upper substrate and the pixel electrode or the common electrode which is located at a top portion of the solid protrusion structure is D1, a gap between the auxiliary spacer and the upper substrate or the lower substrate is D2, and D1 is greater than or equal to D2.

8. The transflective type blue phase liquid crystal display module according to claim 1, wherein, the solid protrusion structure is made of a transparent photoresist layer.

9. The transflective type blue phase liquid crystal display module according to claim 1, wherein, the upper portion of the solid protrusion structure is a triangle and the lower portion of the solid protrusion structure is a trapezoid.

10. A transflective type blue phase liquid crystal display device including a transflective type blue phase liquid crystal display module, and the transflective type blue phase liquid crystal display module comprises:

an upper substrate;

a lower substrate disposed oppositely to the upper substrate; and blue phase liquid crystal molecules disposed between the upper substrate and the lower substrate;

wherein, the lower substrate is provided with multiple solid protrusion structures, pixel electrodes and common electrodes are disposed alternately and disposed at intervals on an upper surface of each solid protrusion structure, each solid protrusion structure includes an upper portion and a lower portion, the upper portion of the solid protrusion structure is corresponding to a transmissive region, a location of the lower substrate corresponding to the lower portion which is not overlapped with the upper portion of the solid protrusion structure is provided with a reflective layer in order to form a reflective region; and between the pixel electrodes and the common electrodes, electric fields that are in parallel with a surface of each solid protrusion structure are generated in order to drive the blue phase liquid crystal molecules, slope inclination angles of the upper portion and the lower portion of each solid protrusion structure are different such that optical delay properties at the transmissive region and the reflective region are identical.

11. The transflective type blue phase liquid crystal display device according to claim 10, wherein, the slope inclination angle at the upper portion is smaller than the slope inclination angle at the lower portion.

12. The transflective type blue phase liquid crystal display device according to claim 11, wherein, the slope inclination angle at the upper portion and the slope inclination angle at the lower portion are ranged from 25 degrees to 75 degrees.

13. The transflective type blue phase liquid crystal display device according to claim 12, wherein, the slope inclination angle at the upper portion is smaller than 45 degrees.

14. The transflective type blue phase liquid crystal display device according to claim 13, wherein, the slope inclination angle at the lower portion is greater than 45 degrees.

15. The transflective type blue phase liquid crystal display device according to claim 10, wherein, a phase delay of the transmissive region is two times of a phase delay of the reflective region.

16. The transflective type blue phase liquid crystal display device according to claim 10, wherein, the transflective type blue phase liquid crystal display module further comprises an auxiliary spacer clamped between the upper substrate and the lower substrate, wherein a gap between the upper substrate and the pixel electrode or the common electrode which is located at a top portion of the solid protrusion structure is D1, a gap between the auxiliary spacer and the upper substrate or the lower substrate is D2, and D1 is greater than or equal to D2.

17. The transflective type blue phase liquid crystal display device according to claim 10, wherein, the solid protrusion structure is made of a transparent photoresist layer.

18. The transflective type blue phase liquid crystal display device according to claim 10, wherein, the upper portion of the solid protrusion structure is a triangle and the lower portion of the solid protrusion structure is a trapezoid.

* * * * *